(12) United States Patent
Okamura

(10) Patent No.: US 10,514,012 B2
(45) Date of Patent: Dec. 24, 2019

(54) CONTROL DEVICE FOR VEHICLE

(71) Applicant: TOYOTA JIDOSHA KABUSHIKI KAISHA, Toyota-shi, Aichi-ken (JP)

(72) Inventor: Yukari Okamura, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 63 days.

(21) Appl. No.: 15/712,445

(22) Filed: Sep. 22, 2017

(65) Prior Publication Data
US 2018/0142659 A1 May 24, 2018

(30) Foreign Application Priority Data
Nov. 18, 2015 (JP) .................. 2016-225316

(51) Int. Cl.
*F02N 11/04* (2006.01)
*F02N 11/08* (2006.01)
(Continued)

(52) U.S. Cl.
CPC ........ *F02N 11/0803* (2013.01); *F02N 19/005* (2013.01); *F02N 99/006* (2013.01);
(Continued)

(58) Field of Classification Search
CPC ...... F02N 11/04; F02N 11/06; F02N 11/0814; F02N 11/0844; F02N 19/005; F02N 99/006; F02N 2019/008; F02N 2200/02; F02N 2200/021; F02N 2300/104; F02N 2300/2002
(Continued)

(56) References Cited

U.S. PATENT DOCUMENTS

2004/0149247 A1* 8/2004 Kataoka ................ F02N 11/006
123/179.4
2007/0119403 A1* 5/2007 Laubender ............. F02N 11/08
123/179.3
(Continued)

FOREIGN PATENT DOCUMENTS

JP 2015-150939 A 8/2015
JP 2016-33007 3/2016
(Continued)

OTHER PUBLICATIONS partial translation of WO 2015/011999 (paragraphs 74-80), Suzuki et al, 2015 (Year: 2015).*

*Primary Examiner* — Erick R Solis
(74) *Attorney, Agent, or Firm* — Finnegan, Henderson, Farabow, Garrett & Dunner, LLP

(57) ABSTRACT

A control device is provided for controlling a vehicle that includes: an internal combustion engine having a fuel injection valve, an ignition device and an in-cylinder pressure sensor; and an electric motor configured to rotate to drive a crankshaft of the internal combustion engine. The control device is configured, when an assist torque is applied to the crankshaft by means of the electric motor, to perform an ignition start-up operation that starts fuel injection and ignition from an expansion stroke cylinder to start up the internal combustion engine. The assist torque is a torque by which the crankshaft is not caused to rotate, and is greater when an in-cylinder pressure in a compression stroke cylinder is higher.

2 Claims, 6 Drawing Sheets

(51) Int. Cl.
 *F02N 19/00* (2010.01)
 *F02N 99/00* (2010.01)
(52) U.S. Cl.
 CPC ..... *F02N 11/0814* (2013.01); *F02N 2019/008* (2013.01); *F02N 2200/021* (2013.01); *F02N 2300/2002* (2013.01)
(58) Field of Classification Search
 USPC .................................. 123/179.4, 179.5, 491
 See application file for complete search history.

(56) References Cited

U.S. PATENT DOCUMENTS

2015/0224985 A1   8/2015  Gotou et al.
2016/0208761 A1   7/2016  Nagai et al.

FOREIGN PATENT DOCUMENTS

WO    WO2015/011999 A1    1/2015
WO    WO 2015/029650 A1   3/2015
WO    WO 2016/016708 A1   2/2016

* cited by examiner

CONTROL DEVICE FOR VEHICLE

CROSS-REFERENCE TO RELATED APPLICATION

This application is based on and claims the benefit of Japanese Patent Application No. 2016-225316, filed on Nov. 18, 2016, which is incorporated by reference herein in its entirety.

BACKGROUND

Technical Field

The present disclosure relates to a control device for a vehicle, and more particularly to a control device that is suitable for controlling a vehicle in which an ignition start-up operation that starts fuel injection and ignition from an expansion stroke cylinder where a piston therein is in an expansion stroke during stop of the internal combustion engine is performed to start up an internal combustion engine.

Background Art

For example, WO 2015/029650 A1 discloses a control device for a vehicle in which an ignition start-up operation that starts fuel injection and ignition from an expansion stroke cylinder where a piston therein is in an expansion stroke during stop of the internal combustion engine is performed to start up an internal combustion engine. At the time of the ignition start-up operation, this control device applies, to a crankshaft, an assist torque for assisting the rotation of the crankshaft by means of an electric motor.

WO 2015/029650 A1 is a patent document which may be related to the present disclosure.

SUMMARY

A vehicle for which an S&S (Stop & Start) control is performed is known as with the vehicle disclosed in WO 2015/029650 A1. According to the S&S control, the operation of an internal combustion engine is automatically stopped when a predetermined engine stop condition is met during a temporary stop of the vehicle or during running of the vehicle, and the internal combustion engine is restarted when a predetermined engine start-up condition is met thereafter. The in-cylinder pressure in a compression stroke cylinder in which a piston therein is in a compression stroke during an engine stop with this kind of S&S control continues to decrease toward the atmospheric air pressure with a lapse of time after the engine stop. The interval from an engine stop with the S&S control to the next engine start-up is generally short. Therefore, if an engine start-up request is made during a time period in which the in-cylinder pressure in the compression stroke cylinder is decreasing, the in-cylinder pressure in the compression stroke cylinder is different depending on a timing at which the start-up request is made.

According to the control device disclosed in WO 2015/029650 A1, the magnitude of the in-cylinder pressure in the compression stroke cylinder existing when the engine start-up request is made is not taken into consideration with respect to the decision of the assist torque. If the in-cylinder pressure in the compression stroke cylinder existing when the engine start-up request is made is higher, the reaction force (in detail, compression reaction force) which is generated when the crankshaft rotates as a result of the ignition start-up operation becomes greater. Therefore, if the assist torque for the ignition start-up operation that is performed as a result of the engine start-up request is determined without any consideration given to the magnitude of the in-cylinder pressure in the compression stroke cylinder existing when the engine start-up request is made, there is the possibility that the rotation of the crankshaft may not be properly assisted. To be more specific, there is a concern that, when the assist torque is too large, the startability of the internal combustion engine may decrease due to the fact that the crankshaft starts to rotate before the start of combustion with the ignition start-up operation, or a concern that, when the assist torque is too small, an engine start-up failure may occur.

The present disclosure has been made to address the problem described above, and an object of the present disclosure is to provide a control device for a vehicle that, when an ignition start-up operation is performed, can apply a more appropriated amount of torque to the crankshaft by taking into consideration the magnitude of the in-cylinder pressure in the compression stroke cylinder existing when an engine start-up request is made.

A control device for controlling a vehicle according to one aspect of the present disclosure is configured to control a vehicle that includes:

an internal combustion engine that includes a fuel injection valve configured to inject fuel directly into a cylinder, an ignition device configured to ignite an air-fuel mixture and an in-cylinder pressure sensor configured to detect in-cylinder pressure; and an electric motor configured to rotate to drive a crankshaft of the internal combustion engine.

The control device is configured, when an assist torque for assisting a rotation of the crankshaft is applied to the crankshaft by means of the electric motor, to perform an ignition start-up operation that starts fuel injection and ignition from an expansion stroke cylinder where a piston therein is in an expansion stroke during stop of the internal combustion engine to start up the internal combustion engine.

The assist torque is a torque by which the crankshaft is not caused to rotate during the stop of the internal combustion engine, and is greater when an in-cylinder pressure in a compression stroke cylinder where a piston therein is in a compression stroke when an engine start-up request with the ignition start-up operation is made is higher.

A control device for controlling a vehicle according to another aspect of the present disclosure is configured to control a vehicle that includes:

an internal combustion engine that includes a fuel injection valve configured to inject fuel directly into a cylinder and an ignition device configured to ignite an air-fuel mixture; and an electric motor configured to rotate to drive a crankshaft of the internal combustion engine.

The control device is configured, when an assist torque for assisting a rotation of the crankshaft is applied to the crankshaft by means of the electric motor, to perform an ignition start-up operation that starts fuel injection and ignition from an expansion stroke cylinder where a piston therein is in an expansion stroke during stop of the internal combustion engine to start up the internal combustion engine.

The assist torque is a torque by which the crankshaft is not caused to rotate during the stop of the internal combustion engine, and is greater when a time period from an engine stop time point to a time point at which an engine start-up request with the ignition start-up operation is made is shorter, while using, as a lower limit of the time period, a value of the time period obtained when an in-cylinder pressure in a compression stroke cylinder where a piston therein is in a compression stroke reaches an atmospheric air pressure.

According to the control device for a vehicle of one aspect of the present disclosure, the assist torque of the electric motor is determined to be a torque by which the crankshaft is not caused to rotate during the stop of the internal combustion engine, and be greater when an in-cylinder pressure in a compression stroke cylinder where a piston therein is in a compression stroke when an engine start-up request with the ignition start-up operation is made is higher. The crankshaft is harder to be rotated when the in-cylinder pressure in the compression stroke cylinder existing when an engine start-up request is made is higher. Therefore, according to the determination method of the assist torque of this aspect of the present disclosure, an appropriate amount of assist torque can be applied to the crankshaft by taking into consideration the magnitude of the in-cylinder pressure in the compression stroke cylinder existing when the engine start-up request is made.

According to the control device for a vehicle of another aspect of the present disclosure, the assist torque of the electric motor is determined to be a torque by which the crankshaft is not caused to rotate during the stop of the internal combustion engine, and be greater when a time period from an engine stop time point to a time point at which an engine start-up request with the ignition start-up operation is made is shorter, while using, as a lower limit of the time period, a value of the time period obtained when an in-cylinder pressure in a compression stroke cylinder where a piston therein is in a compression stroke reaches an atmospheric air pressure. The in-cylinder pressure in the compression stroke cylinder continues to decrease with a lapse of the aforementioned time period and continues to approach the atmospheric air pressure. Therefore, according to the determination method of the assist torque of this aspect of the present disclosure, an appropriate amount of assist torque can be applied to the crankshaft by taking into consideration the length of the aforementioned time period.

DETAILED DESCRIPTION

In the following, embodiments of the present disclosure are described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

First, a first embodiment according to the present disclosure will be described with reference to FIGS. 1 to 6.
[System Configuration According to First Embodiment]

Figure 1:
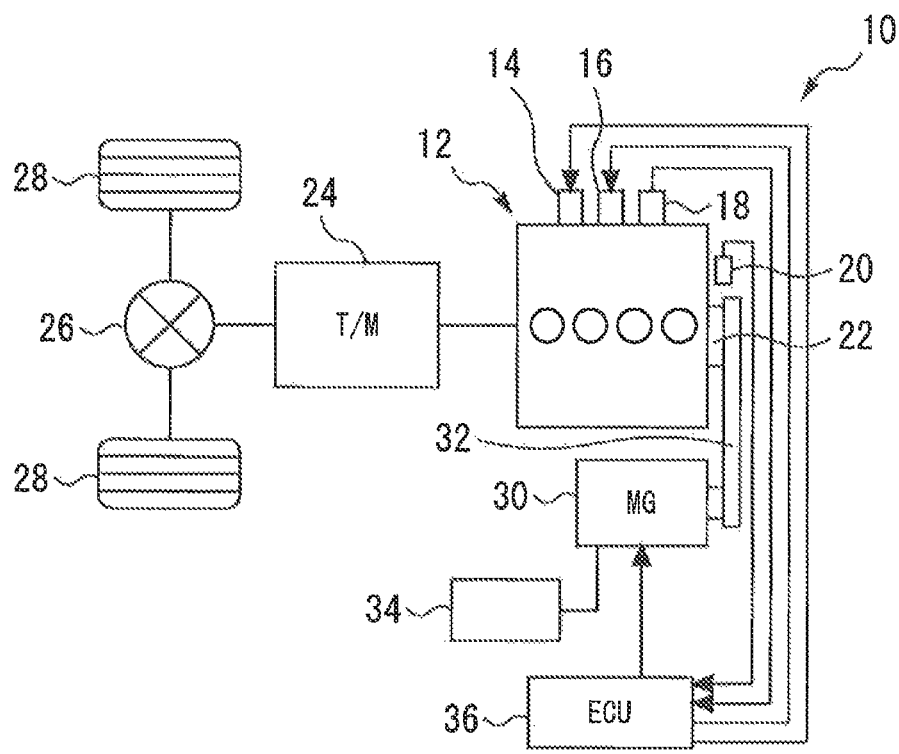
FIG. 1 is a schematic diagram for describing a system configuration of a vehicle according to a first embodiment of the present disclosure.

FIG. 1 is a schematic diagram for describing a system configuration of a vehicle 10 according to the first embodiment of the present disclosure. The vehicle 10 shown in FIG. 1 includes a spark ignition type internal combustion engine 12 as its power source. The internal combustion engine 12 is an in-line four-cylinder engine as an example.

The internal combustion engine 12 is provided with fuel injection valves 14 and an ignition device 16. The fuel injection valves are arranged for the respective cylinders, and are configured to inject fuel directly into the respective cylinders. The ignition device 16 is configured to ignite an air-fuel mixture in each cylinder by means of a spark plug arranged in each cylinder. The internal combustion engine 12 is also provided with in-cylinder pressure sensors 18 and a crank angle sensor 20. The in-cylinder pressure sensors 18 are arranged for the respective cylinders, and output signals according to the in-cylinder pressures in the respective cylinders. The crank angle sensor 20 outputs a signal according to the rotational position of a crankshaft 22. According to the crank angle sensor 20, the engine speed can be obtained, and the stop position of the crankshaft 22 during an engine stop (that is, a piston stop position) can also be obtained.

The torque generated by the internal combustion engine 12 is transmitted to drive wheels 28 via a transmission 24 and a differential gear 26. The vehicle 10 is provided with a motor generator (hereafter, also referred to as an "MG") 30. The MG 30 is coupled to the crankshaft 22 via a belt 32. The MG 30 is electrically connected to a battery 34. The MG 30 serves as a generator to convert, into an electric power, the torque of the crankshaft 22 generated as a result of combustion. The electric power generated by the MG30 is stored in the battery 34. The MG30 also serves as an electric motor configured to rotate to drive the crankshaft 22 by means of the electric power of the battery 34. In addition, the MG30 and the crankshaft 22 are not always coupled to each other via the belt 32, and may not be coupled via a gear or directly.

The system according to the present embodiment is provided with an electronic control unit (ECU) 36. The ECU 36 includes at least an input/output interface, a memory, and a central processing unit (CPU), and entirely controls the system of the vehicle 10. Various sensors for obtaining the operational state of the vehicle 10, such as an engine operational state are electrically connected to the ECU 36, as well as the in-cylinder pressure sensor 18 and the crank angle sensor 20 that are described above. Moreover, various actuators for controlling the operation of the vehicle 10 are electrically connected to the ECU 36, as well as the fuel injection valves 14, the ignition device 16 and the MG30 that are described above. Various control programs and maps for controlling the vehicle 10 are stored in the memory. The CPU reads out a control program from the memory and executes the control program, and generates actuating signals for the various actuators on the basis of the received sensor signals.

[Control According to First Embodiment]
(S&S Control)

An S&S (Stop & Start) control is included in controls that are performed by the ECU 36. In the S&S control according to the present embodiment, the operation of the internal combustion engine 12 is automatically stopped as a result of stop of a fuel supply when a predetermined engine stop condition is met during a temporary stop of the vehicle 10, and the internal combustion engine 12 is restarted when a predetermined engine start-up condition is met thereafter. The engine stop condition is met, for example, when a brake pedal is depressed with a force that is greater than or equal to a predetermined value during the temporary stop of the vehicle 10. On the other hand, one example of the engine start-up condition will be described later with reference to FIG. 6.

(Ignition Start-Up Operation)

In the present embodiment, as one of the start-up methods for restarting the internal combustion engine 12 using the S&S control, the following ignition start-up operation is used. According to the ignition start-up operation, fuel injection and ignition is started from a cylinder in which a piston therein is in an expansion stroke during stop of the internal combustion engine 12 (hereafter, referred to as an "expansion stroke cylinder"), whereby the internal combustion engine 12 in a warmed state is started. In the present embodiment, in order to enable an engine start-up to be surely performed using the ignition start-up operation, the ignition start-up operation is performed in a state in which an assist torque for assisting the rotation of the crankshaft 22 is applied to the crankshaft 22 by means of the MG 30.

(Problem at Time of Ignition Start-Up Operation)

It is favorable that the value of an assist torque applied to the crankshaft 22 by means of the MG30 at the time of the ignition start-up operation is made as great as possible, provided that the crankshaft is not caused to rotate when the assist torque is applied. An assist torque based on this kind of concept is herein referred to as an "optimum torque". The assist torque used in the present embodiment is the optimum torque. By performing the ignition start-up operation with the optimum torque being applied to the crankshaft 22, the ignition start-up operation can be achieved with high probability.

A combustion that occurs first as a result of performing fuel injection and ignition for the expansion stroke cylinder with the ignition start-up operation is referred to as an "initial combustion". A force that serves a reaction force when the crankshaft 22 rotates by an explosive force of the initial combustion is a reaction force (compression reaction force) in a cylinder in which a piston therein is in a compression stroke during stop of the internal combustion engine (hereafter, referred to as a "compression stroke cylinder"). This reaction force becomes greater when the in-cylinder pressure in the compression stroke cylinder is higher. Thus, the value of the torque required as the optimum torque becomes greater when the in-cylinder pressure in the compression stroke cylinder is higher.

Figure 2:
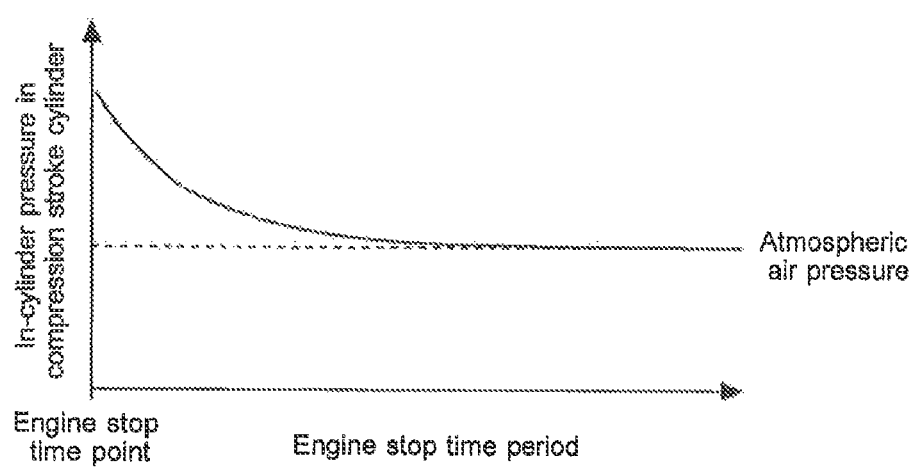
FIG. 2 is a time chart that illustrates a change of the in-cylinder pressure from an engine stop time point with respect to a compression stroke cylinder where a piston therein is in a compression stroke.

FIG. 2 is a time chart that illustrates a change of the in-cylinder pressure from an engine stop time point with respect to the compression stroke cylinder. In the compression stroke cylinder in which intake and exhaust valves are closed, gas in the combustion chamber flows to a crank chamber through a gap between the piston and the cylinder wall after an engine stop. As a result, as shown in FIG. 2, the in-cylinder pressure in the compression stroke cylinder continues to decrease with a lapse of time from the engine stop time point (that is, a time point at which the rotation of the crankshaft 22 has stopped), and continues to approach the atmospheric air pressure. Thus, if a change of the in-cylinder pressure in the compression stroke cylinder due to a lapse of time is taken into consideration, the optimum torque decreases with a lapse of time. In addition, not only in the compression stroke cylinder but also in the expansion stroke cylinder, the in-cylinder pressure continues to decrease with a lapse of time after an engine stop, provided that intake and exhaust valves are closed.

Figure 3:
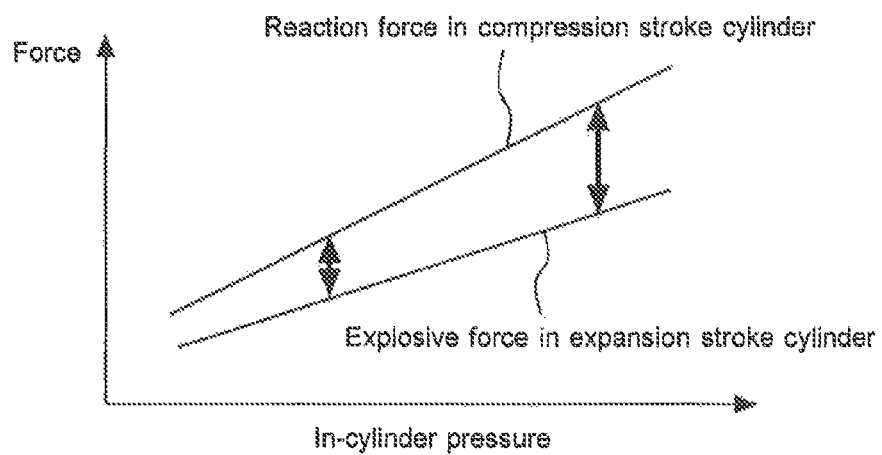
FIG. 3 is a graph that illustrates a relationship between the reaction force in the compression stroke cylinder and the explosive force in an expansion stroke cylinder at a starting point of time of an ignition start-up operation, and the in-cylinder pressure.

FIG. 3 is a graph that illustrates a relationship between the reaction force in the compression stroke cylinder and the explosive force in the expansion stroke cylinder at a starting point of time of the ignition start-up operation, and the in-cylinder pressure. As described above and also shown in FIG. 3, the reaction force in the compression stroke cylinder becomes greater when the in-cylinder pressure in the compression stroke cylinder is higher. Also, as shown in FIG. 3, the explosive force of the initial combustion in the expansion stroke cylinder becomes greater when the in-cylinder pressure in the expansion stroke cylinder is higher. However, as represented by FIG. 3, with respect to an increase of the in-cylinder pressure, the increase rate of the reaction force described above is greater than that of the explosive force of the initial combustion.

The interval from an engine stop with the S&S control to the next engine start-up is generally short. Therefore, if an engine start-up request is made during a time period in which the in-cylinder pressure in the compression stroke cylinder is decreasing as shown in FIG. 2, the in-cylinder pressure in the compression stroke cylinder is different depending on a timing at which the start-up request is made. If, nevertheless, the assist torque for the ignition start-up operation that is performed as a result of the engine start-up request is determined without any consideration given to the magnitude of the in-cylinder pressure in the compression stroke cylinder existing when the engine start-up request is made, there is the possibility that the rotation of the crankshaft 22 may not be properly assisted. To be more specific, there is a concern that, when the assist torque is too large, the startability of the internal combustion engine 12 may decrease due to the fact that the crankshaft starts to rotate before the start of combustion with the ignition start-up operation, or a concern that, when the assist torque is too small, an engine start-up failure may occur.

(Determination Method of Assist Torque Based on in-Cylinder Pressure)

As described above, as a result of the earnest study of the present inventor, it has been found out that, in order to more properly perform a torque assist using the MG30 at the time of the ignition start-up operation, determining the assist torque (that is, the optimum torque) with taking into consideration the in-cylinder pressure existing when an engine start-up request is made is better. Accordingly, in the present embodiment, the assist torque of the MG30 is changed in accordance with the in-cylinder pressure in the compression stroke cylinder in which a piston is in a compression stroke when an engine start-up request that uses the ignition start-up operation is made (which is the same as the above described compression stroke in which a piston is in a compression stroke during the engine stop). Hereafter, an example of the concrete setting of the assist torque based on the in-cylinder pressure in the compression stroke cylinder will be described with reference to FIG. 4.

Figure 4:
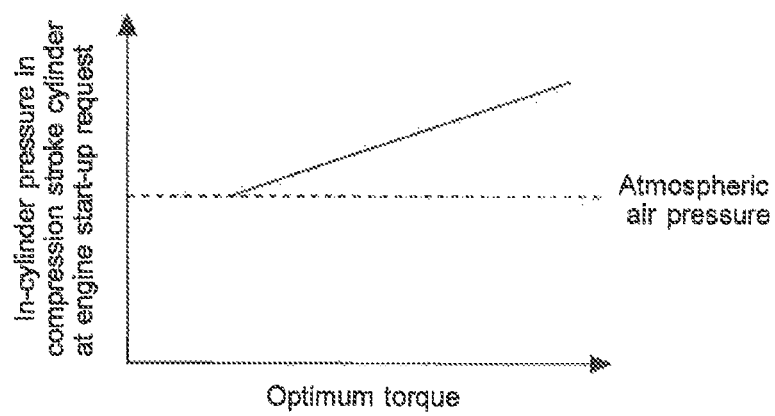
FIG. 4 is a graph that illustrates a relationship between the in-cylinder pressure in the compression stroke cylinder at the time of an engine start-up request and an optimum torque.

FIG. 4 is a graph that illustrates a relationship between the in-cylinder pressure in the compression stroke cylinder at the time of an engine start-up request and the optimum torque. As shown in FIG. 4, the assist torque of the MG 30 (that is, the optimum torque) is a torque by which the crankshaft 22 is not caused to rotate during an engine stop, and is determined so as to be greater when the in-cylinder pressure in the compression stroke cylinder existing when an engine start-up with the ignition start-up operation is made is higher. To be more specific, the value of the assist torque at each in-cylinder pressure is determined, as described above, so as to be made as great as possible, provided that the crankshaft 22 is not caused to rotate during the engine stop.

(Concrete Processing According to First Embodiment)

Figure 5:
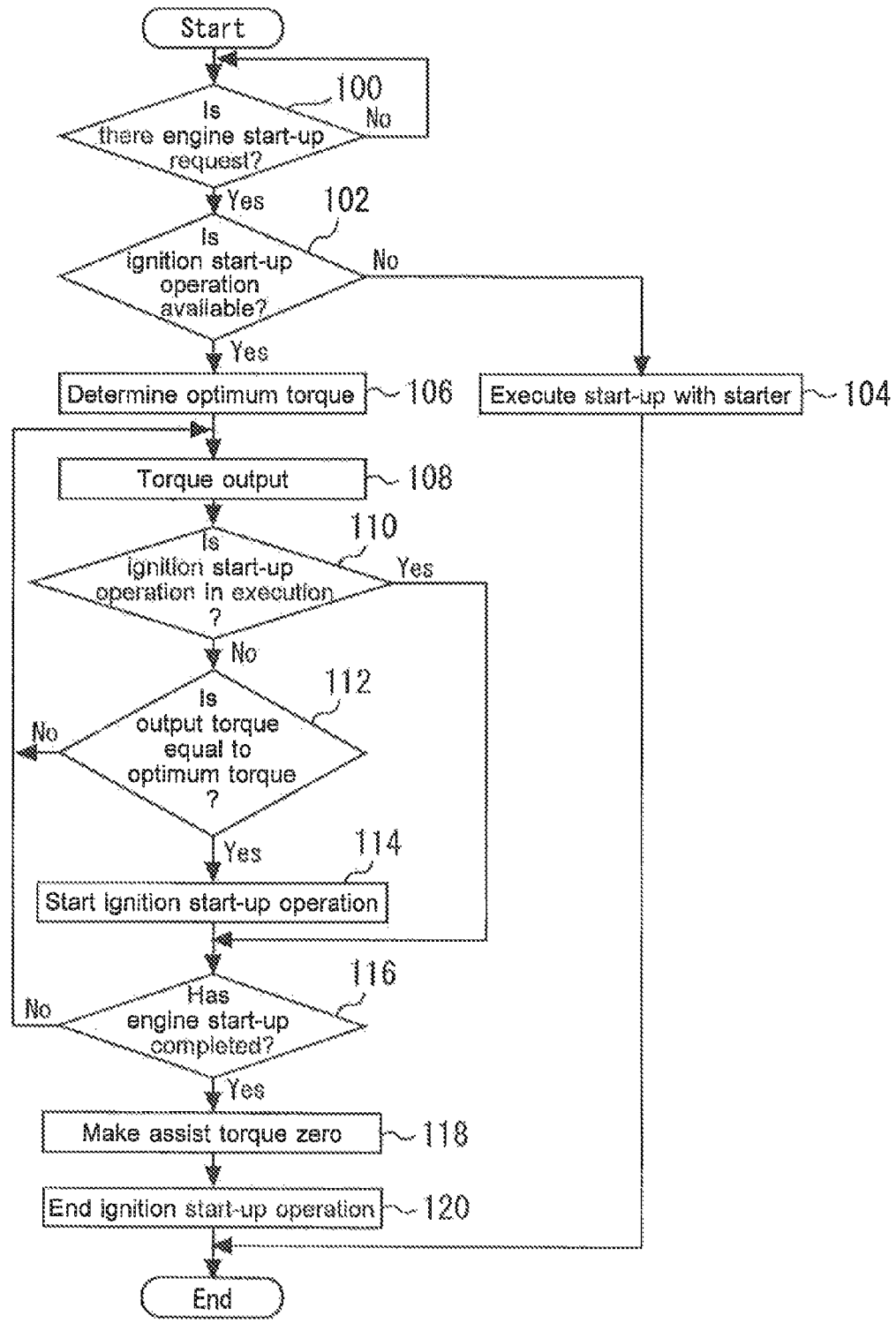
FIG. 5 is a flow chart that represents a routine of the processing after an engine stop in an S&S control according to the first embodiment of the present disclosure.

FIG. 5 is a flow chart that represents a routine of the processing after an engine stop in the S&S control according to the first embodiment of the present disclosure. In addition, the present routine is started for every engine stop with the S&S control.

In the routine shown in FIG. 5, first, the ECU 36 determines whether or not there is an engine start-up request, in other words, whether or not a predetermined engine start-up condition is met (step S100). More specifically, it is determined whether or not there is an engine start-up request based on an operation by the driver of the vehicle (for example, a decrease in depression force of a brake pedal), and it is also determined whether or not there is an engine start-up request from the vehicle 10 (for example, a request based on a decrease in intake negative pressure, or a request based on the State of Charge (SOC) of the battery 34). If, as a result of this, the ECU 36 determines that there is not an engine start-up request, the ECU 36 executes the processing of step S100 repeatedly.

If the ECU 36 determines in step S100 that there is an engine start-up request, the ECU 36 determines, in accordance with, for example, the following processing, whether or not the ignition start-up operation is available (step S102). That is, the stop position of the crankshaft 22 during the current engine stop is obtained using the crank angle sensor 20. In the example of an in-line four-cylinder engine, the piston stop position of each cylinder is almost aligned basically at the nearly center of each stroke. However, the piston stop position of the compression stroke cylinder may be located near the compression top dead center on rare occasions. In such occasions, the piston stop position of the expansion stroke cylinder is located near the expansion bottom dead center. Since the exhaust valve is open in this position, the ignition start-up operation cannot be performed. Therefore, in this example, it is determined in step S102 that the ignition start-up operation is not available. In addition, if the remaining amount of the battery 34 is too less, the assist of the rotation of the crankshaft 22 by the MG 30 is no longer performed. According to step S102, in this example, it is also determined in step S102 that the ignition start-up operation is not available. If, on the other hand, a condition where the use of the ignition start-up operation as described above should be excluded is not met, it is determined in step S102 that the ignition start-up operation is available.

If the ECU 36 determines in step S102 that the ignition start-up operation is not available, the ECU 36 selects a start-up method of not using the ignition start-up operation (as an example, a starter start-up that uses a starter motor (not shown)) (step S104). After the ECU 36 proceeds to step S104 like this, the processing according to the present routine is ended. If, on the other hand, the ignition start-up operation is available, the ECU 36 proceeds to step S106.

In step S106, the optimum torque that is an optimum value of the assist torque of the MG 30 is determined. The ECU 36 stores a map (not shown) that defines, as shown in FIG. 4, a relationship between the in-cylinder pressure in the compression stroke cylinder at the time of an engine start-up request and the optimum torque. In step S106, the ECU 36 obtains the current in-cylinder pressure in the compression stroke cylinder (that is, the in-cylinder pressure when the engine start-up request is made) using the in-cylinder pressure sensor 18, and thereafter, obtains an optimum torque depending on the obtained in-cylinder pressure with reference to this kind of map. The optimum torque is obtained as a value that is greater when the obtained in-cylinder pressure is higher, as described above. In more detail, the value of the assist torque for each in-cylinder pressure in the aforementioned map is set so as to be made as great as possible, provided that the crankshaft 22 is not caused to rotate during the engine stop.

Next, the ECU 36 controls the MG 30 such that the determined optimum torque is outputted (step S108). The ECU 36 then determines whether or not the ignition start-up operation is in execution (step S110). In step S110, it is determined that the ignition start-up operation is in execution, as far as the internal combustion engine 12 is during a time period from a start of the ignition start-up operation (more specifically, a start of fuel injection and ignition for the expansion stroke cylinder) to an end of the ignition start-up operation (a time point at which the following determination in step S116 is met).

If the ECU 36 determines in step S110 that the ignition start-up operation is not in execution, that is, if the ignition start-up operation has not yet been started, the ECU 36 proceeds to step S112. In step S112, the ECU 36 determines whether or not the current output torque of the MG 30 has reached the optimum torque. As a result, if the result of this determination is negative, the ECU 36 repeatedly executes the processing of step S108 onward.

If, on the other hand, the ECU 36 determines in step S112 that the output torque has reached the optimum torque, the ECU 36 starts the ignition start-up operation (step S114). In detail, the fuel injection and ignition for the expansion stroke cylinder is performed.

After executing the processing of step S114, or if the ECU 36 determines in step S110 that the ignition start-up operation is in execution, the ECU 36 determines whether or not the engine start-up using the ignition start-up operation has completed (step S116). Whether or not the engine start-up has completed can be determined on the basis of whether or not the engine speed has reached a certain rotational speed. If, as a result, it is determined that the engine start-up has not yet completed, the ECU 36 repeatedly executes the processing of step S108 onward.

If, on the other hand, the ECU 36 determines in step S116 that the engine start-up has completed, the ECU 36 controls the MG 30 such that, in order to end the torque assist using the MG 30, the assist torque (that is, the optimum torque) is made zero (step S118). The ECU 36 then ends the ignition start-up operation (step S120). In more detail, the fuel ignition control and the ignition control for each cylinder are switched from the controls for the engine start-up using the ignition start-up operation to predetermined controls to be performed after completion of the engine start. After the ECU 36 proceeds to the processing of step S120, the processing according to the present routine is also ended.

Figure 6:
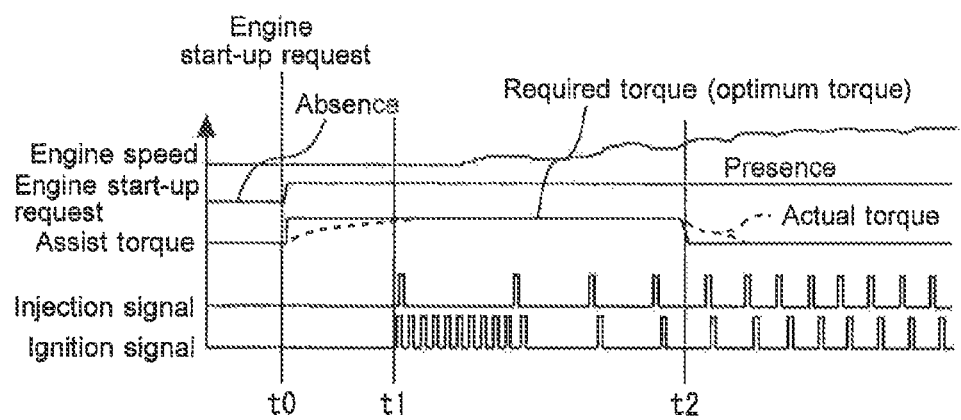
FIG. 6 is a time chart that illustrates an example of the operation of the vehicle that is performed when the ignition start-up operation is performed in accordance with the processing of the routine shown in FIG. 5.

FIG. 6 is a time chart that illustrates an example of the operation of the vehicle 10 that is performed when the ignition start-up operation is performed in accordance with the processing of the routine shown in FIG. 5. A time point t0 shown in FIG. 6 corresponds to a time point at which the engine start-up request is detected during execution of the S&S control (during the engine stop). Of two waveforms of the assist torque shown in FIG. 6, one of the waveforms with the solid line denotes the required torque (the optimum torque determined in step S108), and the other with the broken line denotes the actual torque (the output torque).

According to the routine shown in FIG. 5, if the ignition start-up operation is available when the engine start-up request is detected at the time point t0, a torque output instruction to the MG 30 is immediately made in such a manner that the required torque that is the optimum torque depending on the in-cylinder pressure in the compression stroke cylinder is achieved. A time point t1 shown in FIG. 6 corresponds to a time point at which the actual torque of the MG 30 has reached the required torque. If the time point t1 has come, the ignition start-up operation is started (that is, the fuel injection and ignition for the expansion stroke cylinder is performed).

The injection signal and ignition signal shown in FIG. 6 denote the timings of the fuel injection and ignition for each cylinder that are performed in the order according to a predetermined explosion order. In the example shown in FIG. 6, the fuel injection and ignition for each cylinder are performed in the order from fuel injection to ignition. In particular, the ignition for achieving the initial combustion at the expansion stroke cylinder is repeatedly executed, for example, by a predetermined number of times (for example, ten).

The initial combustion at the expansion stroke cylinder and the following combustions at the respective cylinders are performed in series, along with the torque assist using the MG 30, whereby the engine speed continues to increase. A time point t2 shown in FIG. 6 corresponds to a time point at which the engine start-up has completed with the processing of step S116. If the time point t2 has come, the required torque for the MG 30 is made zero and the ignition start-up operation is ended.

According to the control of the present embodiment described so far, if the ignition start-up operation with the torque assist using the MG 30 is performed, the assist torque (the optimum torque) is determined so as to be a torque by which the crankshaft 22 is not caused to rotate during the engine stop and so as to be greater when the in-cylinder pressure in the compression stroke cylinder existing when an engine start-up request is made is higher. As already described, the reaction force by the ignition start-up operation against the rotation of the crankshaft 22 becomes greater when the in-cylinder pressure in the compression stroke cylinder existing when the engine start-up request is made is higher. Thus, according to the above-described determination method of the assist torque, an appropriate amount of assist torque can be applied to the crankshaft 22 by taking into consideration the magnitude of the in-cylinder pressure in the compression stroke cylinder existing when the engine start-up request is made. Consequently, a decrease in the startability of the internal combustion engine 12 due to excess and deficiency of the assist torque can be reduced.

Moreover, it is favorable that, as described above, the assist torque is determined so as to be as great made as possible, provided that the crankshaft 22 is not caused to rotate during the engine stop. In this regard, according to the method of the present embodiment, the assist torque (the optimum torque) is determined in accordance with the in-cylinder pressure in the compression stroke cylinder existing when an engine start-up request is made. Therefore, even if this in-cylinder pressure has any value, the assist torque can be determined appropriately so as to be made as great as possible, provided that the crankshaft 22 is not caused to rotate during the engine stop. In further addition to this, the explosive force of the initial combustion in the expansion stroke cylinder becomes greater when the in-cylinder pressure of the expansion stroke cylinder existing when an engine start-up request is made is higher. However, with respect to an increase of the in-cylinder pressure, the increase rate of the reaction force described above is higher than that of the explosive force of the initial combustion. According to the control of the present embodiment, it can be said that an appropriate amount of assist torque depending on the in-cylinder pressure in the compression stroke cylinder can be applied to the crankshaft 22 even when the relationship between this kind of the compression reaction force and the explosive force of the initial combustion is taken into consideration.

In addition, in the first embodiment described above, in order to determine the optimum torque with a value depending on the in-cylinder pressure in the compression stroke cylinder existing when an engine start-up request is made, the in-cylinder pressure in the compression stroke cylinder is obtained using the in-cylinder pressure sensor 18. As already described, not only in the compression stroke cylinder but also in the expansion stroke cylinder, the in-cylinder pressure continues to decrease with a lapse of time after the engine stop, provided that the intake and exhaust valves are closed. Thus, the detection value of the in-cylinder pressure that is used to determine the optimum torque with a value depending on the in-cylinder pressure in the compression stroke cylinder existing when the engine start-up request is made may be a value of the in-cylinder pressure in the expansion stroke cylinder that is detected by the in-cylinder pressure sensor 18 when the engine start-up request is made, instead of the value of the in-cylinder pressure in the compression stroke cylinder. Moreover, a map that defines a relationship between the detection value of the in-cylinder pressure in the expansion stroke cylinder and the assist torque may be stored, and the assist torque may be determined so as to be greater when the detection value of the in-cylinder of the expansion stroke cylinder is higher. With this kind of method, the assist torque can also be made greater when the in-cylinder pressure in the compression stroke cylinder existing when the engine start-up request is made is higher.

Second Embodiment

Figure 7:
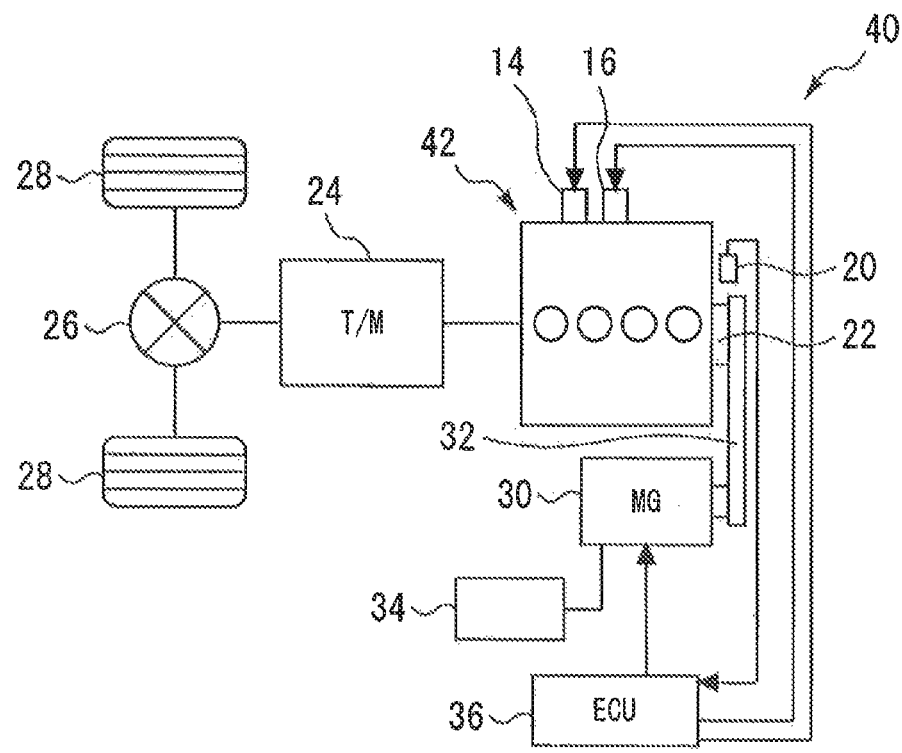
FIG. 7 is a schematic diagram for describing a system configuration of a vehicle according to a second embodiment of the present disclosure.

Next, a second embodiment according to the present disclosure will be described with reference to FIGS. 7 to 9.
[System Configuration According to Second Embodiment]
FIG. 7 is a schematic diagram for describing a system configuration of a vehicle 40 according to the second embodiment of the present disclosure. Note that, in FIG. 7, elements that are the same as constituent elements illustrated in FIG. 1 mentioned above are denoted by the same reference symbols, and a description of those elements is omitted or simplified hereunder.

The Vehicle 40 shown in FIG. 7 is different from the vehicle 10 shown in FIG. 1 with respect to the engine configuration. To be more specific, an internal combustion engine 42 is different from the internal combustion engine 12 in that the in-cylinder pressure sensors 18 are not provided in each cylinder.
[Control According to Second Embodiment]
(Determination Method of Assist Torque Based on Elapsed Time from Engine Stop Time Point)

Figure 8:
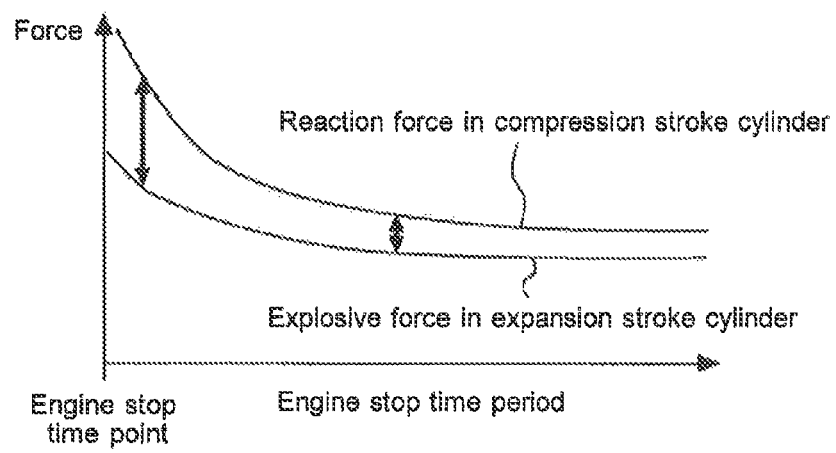
FIG. 8 is a graph that illustrates a relationship between the reaction force in the compression stroke cylinder and the explosive force of the initial combustion in the expansion stroke cylinder, and an engine stop time period (that is, the elapsed time from the engine stop time point)
Figure 9:
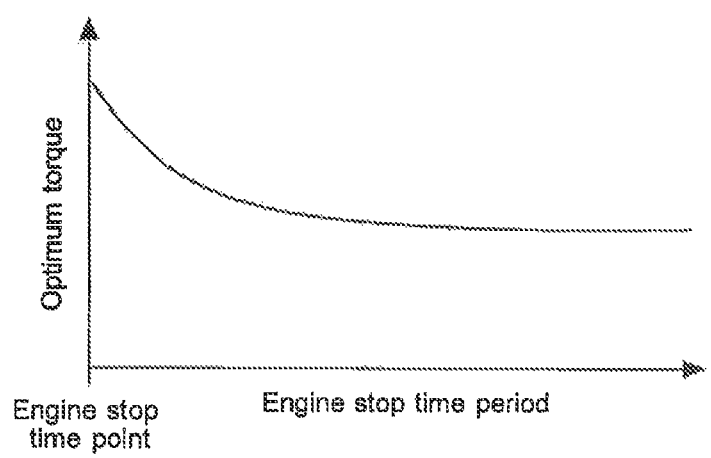
FIG. 9 is a graph that illustrates a relationship between the optimum torque and the engine stop time period.

FIG. 8 is a graph that illustrates a relationship between the reaction force in the compression stroke cylinder and the explosive force of the initial combustion in the expansion stroke cylinder, and the engine stop time period (that is, the elapsed time from the engine stop time point). FIG. 9 is a graph that illustrates a relationship between the optimum torque and the engine stop time period. As already described with reference to FIG. 2, the in-cylinder pressure in the compression stroke cylinder continues to decrease toward the atmospheric air pressure with a lapse of time after the engine stop (this also applies to the in-cylinder pressure in the expansion stroke cylinder). Accordingly, in the present embodiment, the assist torque (that is, the optimum torque) of the MG 30 is determined, as shown in FIG. 9, in such a manner as to be greater when the engine stop time period (that is, the time period from the engine stop time point to a time point at which the engine start-up request is made) is shorter, while using, as a lower limit, a value to be obtained when the in-cylinder pressure in the compression stroke cylinder reaches the atmospheric air pressure. In more detail, the value of the assist torque in each engine stop time period is determined so as to be made as great as possible, provided that the crankshaft 22 is not caused to rotate during the engine stop.

Moreover, as already described with reference to FIG. 3, the reaction force in the compression stroke cylinder and the explosive force in the expansion stroke cylinder become greater when the in-cylinder pressure is higher, and, with respect to an increase of the in-cylinder, the increase rate of the reaction force described above becomes greater than that of the explosive force of the initial combustion. The relationship shown in FIG. 8 is obtained with a combination of the relationship shown in FIG. 2 and the relationship shown in FIG. 3. Specifically, the reaction force in the compression stroke cylinder and the explosive force in the expansion stroke cylinder continue to decrease with a lapse of time as shown in FIG. 8 due to decreases of the in-cylinder pressures in the compression stroke cylinder and the expansion stroke cylinder that are seen as a result of a lapse of time after the engine stop. To be more specific, these reaction force and explosive force continue to approach the values to be obtained when the in-cylinder pressure is the atmospheric air pressure. As shown in FIG. 8, the relationship that the reaction force in the compression stroke cylinder is greater than the explosive force in the expansion stroke cylinder does not invert due to a lapse of time. However, the difference between the reaction force and the explosive force continues to decrease with a lapse of time as shown in FIG. 8. More specifically, the relationship shown in FIG. 9 between the engine stop time period and the optimum torque is determined by taking into consideration the relationship shown in FIG. 8 between the reaction force in the compression stroke cylinder and the explosive force of the initial combustion in the expansion stroke cylinder.
(Concrete Processing According to Second Embodiment)

The processing after the engine stop in the S&S control according to the present embodiment can be executed in accordance with a routine similar to the routine shown in FIG. 5 by changing, as follows, the processing of step S106 relating to the determination method of the assist torque (the optimal torque) of the MG 30. In more detail, in the present embodiment, a map (not shown) that defines the relationship between the engine stop time period and the optimum torque as shown in FIG. 9 is stored in the ECU 36, and the optimum torque is calculated from the engine stop time period with reference to this kind of map. In addition, the engine stop time period can be measured using a timer function of the ECU 36.

According to the control of the present embodiment described so far, if the ignition start-up operation with the torque assist using the MG30 is performed, the assist torque (the optimum torque) is determined so as to be greater when the engine stop time period (that is, the time period from the engine stop time point to a time point at which the engine start-up request is made) is shorter. Therefore, according to the determination method of the assist torque described above, an appropriate amount of assist torque can be applied to the crankshaft 22 by taking into consideration the length of the engine stop time period. In other words, according to the control of the present embodiment, even in the vehicle 40 provided with the internal combustion engine 42 that does not include the in-cylinder pressure sensor 18, the assist torque can be determined appropriately by taking into consideration the magnitude of the in-cylinder pressure in the compression stroke cylinder existing when the engine start-up request is made. Consequently, as in the control according to the first embodiment, the occurrence of an adverse effect due to excess and deficiency of the assist torque can be reduced.

Furthermore, it is favorable that, as described above, the assist torque is made as great as possible, provided that the crankshaft 22 is not caused to rotate during the engine stop. In this regard, according to the method of the present embodiment, the assist torque (the optimum torque) is determined in accordance with the engine stop timer period. Therefore, even if this engine stop time period has any value, the assist torque can be determined appropriately so as to be made as great as possible, provided that the crankshaft 22 is not caused to rotate during the engine stop. In further addition to this, as already described, the difference between the reaction force in the compression stroke cylinder during the engine stop and the explosive force in the expansion stroke cylinder continues to decrease with a lapse of time. According to the control of the present embodiment, it can be said that an appropriate amount of assist torque depending on the length of the engine stop time period (that is, the magnitude of the in-cylinder pressure in the compression stroke cylinder) can be applied to the crankshaft 22 even when the relationship between this kind of the compression reaction force and the explosive force of the initial combustion is taken into consideration.

Third Embodiment

Next, a third embodiment according to the present disclosure will be described with reference to FIG. 10.
[System Configuration According to Third Embodiment]
The system of the vehicle according to the present embodiment is assumed to be similar to the system shown in FIG. 1, except that a six-cylinder internal combustion engine is used instead of the four-cylinder internal combustion engine 12.
[Control According to Third Embodiment]
(Determination Method of Assist Torque Based on in-Cylinder Pressure)
In the four-cylinder internal combustion engine 12 in which combustion is typically performed at intervals of 180 degrees CA, the number of the compression stroke cylinders is one. On the other hand, in the six-cylinder internal combustion engine that is used in the present embodiment, combustion is typically performed at intervals of 120 degrees CA. Thus, in the six-cylinder internal combustion engine, contrary to the four-cylinder internal combustion engine 12, the number of the compression stroke cylinders in which pistons are in the respective compression stroke cylinders during the engine stop varies between one and two depending on the piston stop position. The control according to the present embodiment is basically based on the control according to the first embodiment. Thus, in the present embodiment, as in the embodiments described above, the assist torque (the optimum torque) is determined so as to be greater when the in-cylinder pressure in the compression stroke cylinder existing when the engine start-up request is made is higher.

On that basis, in the present embodiment, it is determined, during an engine stop, whether the number of the compression stroke cylinders is one or two. If, as a result, it is determined that the number of the compression stroke cylinders is one, the assist torque of the MG 30 is determined so as to be a value according to the in-cylinder pressure in the one compression stroke cylinder, in the same manner as that of the first embodiment. If, on the other hand, it is determined that the number of the compression stroke cylinders is two, the assist torque of the MG 30 is determined so as to be a value according to the sum of the in-cylinder pressures in the two compression stroke cylinders.
(Concrete Processing According to Third Embodiment)
FIG. 10 is a flow chart that represents a routine of the processing after an engine stop in the S&S control according to the third embodiment of the present disclosure. The processing of steps S100 to S104, S108 and S120 in the routine shown in FIG. 10 is as already described in the first embodiment.

Figure 10:
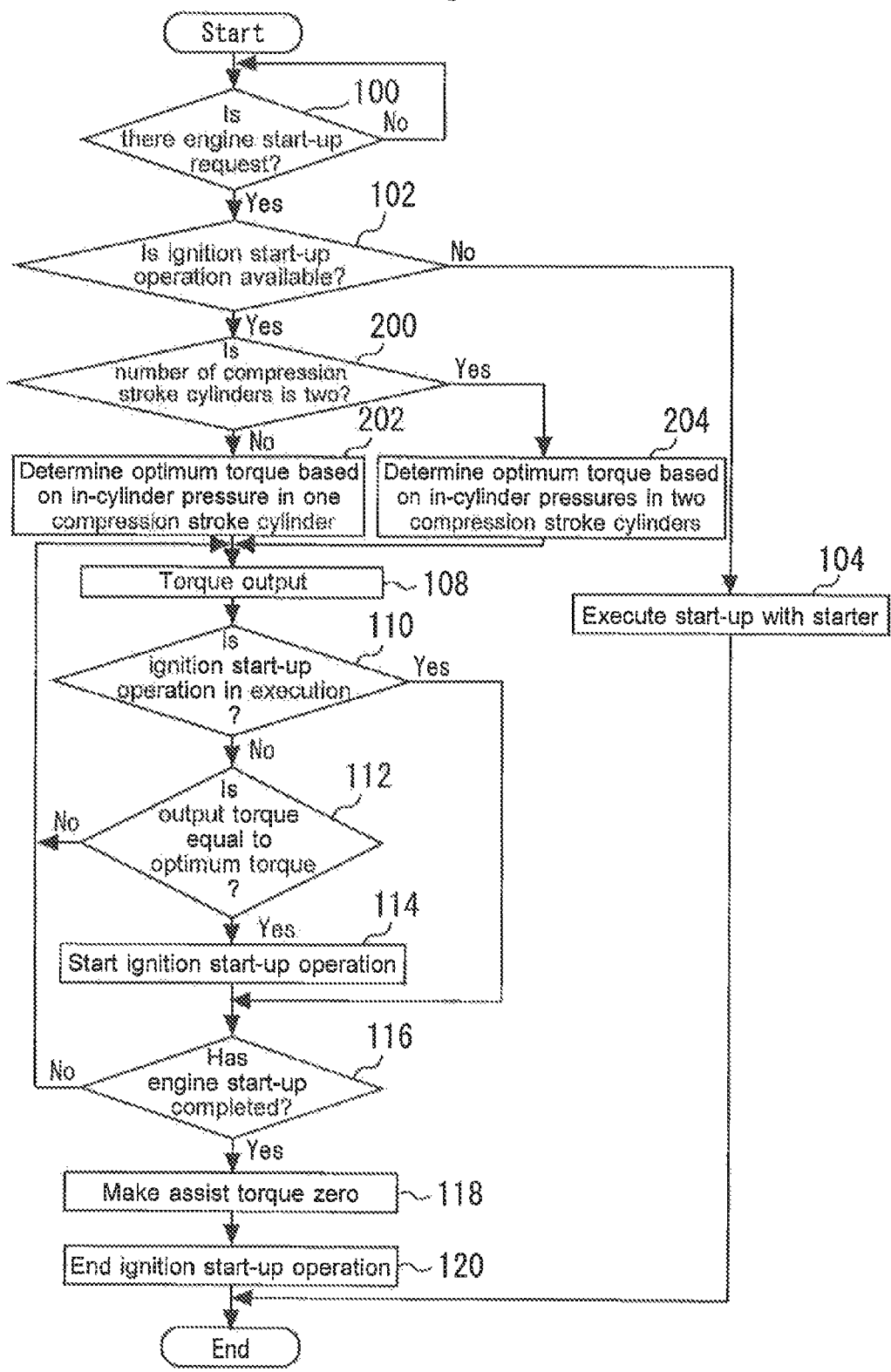
FIG. 10 is a flow chart that represents a routine of the processing after an engine stop in the S&S control according to a third embodiment of the present disclosure.

In the routine shown in FIG. 10, if the ECU 36 determines in step S102 that the ignition start-up operation is available, the ECU 36 then determines whether or not the number of the compression stroke cylinders is two (that is, whether the number is two or one) (step S200). The relative relationship between the piston stop positions of the individual cylinders of an internal combustion engine is mechanically fixed. Thus, this determination can be performed in the following method, for example. That is, whether the number of the compression stroke cylinders is two or one can be determined by obtaining the stop position of the crankshaft 22 by means of the crank angle sensor 20.

If the result of determination in step S200 is negative (that is, if the number of the compression stroke cylinders is one), the ECU 36 then determines the optimum torque on the basis of the in-cylinder pressure in the one compression stroke cylinder (step S202). The processing to determine the optimum torque when the number of the compression stroke cylinders is one is the same as the processing of step S106 according to the first embodiment. That is, in the ECU 36 a map (not shown) is stored that defines in advance the optimum torque so as to be greater when the in-cylinder pressure is higher while assuming that the number of the compression stroke cylinders is one. In this step S202, the in-cylinder pressure in the compression stroke cylinder is obtained by means of the in-cylinder pressure sensor 18, and the optimum torque is determined with reference to the above mentioned map.

If, on the other hand, the result of determination in step S200 is positive (that is, if the number of the compression stroke cylinders is two), the ECU 36 determines the optimum torque on the basis of the sum of the in-cylinder pressures in the two compression stroke cylinders (step S204). In order to achieve the ignition start-up operation in the example in which two compression stroke cylinders are present, a torque of the crankshaft 22 that can surpass the compression reaction forces in both of these two compression stroke cylinders is required. Thus, it is favorable that the assist torque of the MG 30 is determined by taking into consideration the sum of the in-cylinder pressures in the two compression stroke cylinders.

Accordingly, in the ECU 36 a map (not shown) is stored that defines the optimum torque in advance so as to be greater when the sum of the in-cylinder pressures in the two compression stroke cylinders is greater while assuming that the number of the compression stroke cylinders is two. In this step S204, the in-cylinder pressures in the two compression stroke cylinders are obtained by means of the in-cylinder pressure sensors 18, and the optimum torque is determined with reference to the above mentioned map. In further addition to this, in the example in which two compression stroke cylinders are present, the value of the assist torque for each in-cylinder pressure in the aforementioned map is also determined so as to be made as great as possible, provided that the crankshaft 22 is not caused to rotate during the engine stop.

In addition, the in-cylinder pressures in two compression stroke cylinders may be obtained in, for example, the following manner, instead of the manner described above. To be more specific, the relative relationship between the piston stop positions of the individual cylinders of an internal combustion engine is mechanically determined as described above. Thus, if the in-cylinder pressure of one of the two compression stroke cylinders can be grasped, the in-cylinder pressure of the other of the two compression stroke cylinders can be estimated on the basis of the relative relationship of the piston stop positions between the two compression stroke cylinders. Accordingly, the in-cylinder pressure in one compression stroke cylinder is obtained, and the in-cylinder pressure in the other compression stroke cylinder may be estimated on the basis of the obtained in-cylinder pressure in the one compression stroke cylinder and the information of the piston stop positions.

According to the processing of the routine shown in FIG. 10 described so far, regardless of whether the number of the compression stroke cylinders is one or two in the six-cylinder internal combustion engine, the assist for the ignition start-up operation can be performed by means of the MG 30 on the basis of the optimum torque that is appropriately determined depending on the in-cylinder pressure in the compression stroke cylinder existing when the engine start-up request is made. In addition, in the present routine that is addressed to the six-cylinder internal combustion engine, the following determination may be added in the processing of step S102 for determining whether or not the ignition start-up operation is available. In more detail, if a deviation of the in-cylinder pressure that is greater than or equal to a predetermined value is present between two compression stroke cylinders, the ECU 36 may determine that abnormality has occurred and may prohibit to perform the ignition start-up operation.

Fourth Embodiment

Next, a fourth embodiment according to the present disclosure will be described. The system of the vehicle according to the present embodiment is assumed to be similar to the system shown in FIG. 7, except that a six-cylinder internal combustion engine is used instead of the four-cylinder internal combustion engine 42. In other words, the system according to the present embodiment is different from the system according to the third embodiment in that the aforementioned internal combustion engine is not provided with the in-cylinder pressure sensors 18.

[Control According to Fourth Embodiment]

The relationship of the control according to the present embodiment with respect to the control according to the third embodiment is similar to the relationship of the control according to the second embodiment with respect to the control according to the first embodiment. To be more specific, the control according to the present embodiment is basically based on the control according to the second embodiment. Thus, in the present embodiment, the assist torque (that is, the optimum torque) is also determined in such a manner as to be greater when the engine stop time period (that is, the time period from the engine stop time point to a time point at which the engine start-up request is made) is shorter, with, as a lower limit, a value to be obtained when the in-cylinder pressure in the compression stroke cylinder reaches the atmospheric air pressure.

However, contrary to the second embodiment, according to the present embodiment, the map that is used to determine the optimum torque is changed in accordance with whether the number of the compression stroke cylinders is one or two. More specifically, in the example in which the number of the compression stroke cylinders is one, a map (not shown) is selected that defines in advance the relationship between the engine stop time period and the optimum torque while assuming the magnitude of the in-cylinder pressure of the one compression stroke cylinder. On the other hand, in the example in which the number of the compression stroke cylinders is two, a map (not shown) is selected that defines in advance the relationship between the engine stop time period and the optimum torque while assuming the sum of the in-cylinder pressures in the two compression stroke cylinders.

(Concrete Processing According to Fourth Embodiment)

The processing after the engine stop in the S&S control according to the present embodiment can be executed in accordance with a routine similar to the routine shown in FIG. 10 by changing, as follows, the processing of steps S200 to S204 relating to the determination method of the assist torque (the optimal torque) of the MG 30. In more detail, in the present embodiment, the optimum torque depending on the engine stop time period is calculated with reference to this kind of map that is selected as described above in accordance with whether the number of the compression stroke cylinders is one or two.

In addition, the first to fourth embodiments described above, the internal combustion engine 12 or 42 that is an in-line four-cylinder engine or a six-cylinder internal combustion engine is applied as an example. However, the internal combustion engine according to the present disclosure may be an internal combustion engine that includes a plurality of cylinders other than four cylinders or six cylinders, as far as both of the compression stroke cylinder and the expansion stroke cylinder can be present during an engine stop. In further addition to this, even in an internal combustion engine in which the number of the compression stroke cylinders may become three or more, the assist torque may be determined by taking into consideration the sum of the in-cylinder pressures of the three or more compression stroke cylinders, on the basis of a concept similar to that of the third or fourth embodiment.

Furthermore, in the first to fourth embodiments, the internal combustion engine 12 or 42 that includes the MG 30 that is coupled to the crankshaft 22 via the belt 32 is applied as an example. However, the "electric motor" according to the present disclosure may not be always the MG 30 described above, as far as it can rotate to drive the crankshaft. That is, for example, the electric motor may be a motor generator (MG) that is arranged between an internal combustion engine and a transmission and that serves as a power source of the vehicle, along with the internal combustion engine. Moreover, in the example of this kind of vehicle (that is, a hybrid vehicle), when the S&S control is performed not only during the temporary stop of the vehicle but also during the running of the vehicle, the assist torque may be determined in the manner according to any one of the first to fourth embodiments. In addition, if the ignition start-up operation is performed during the running of the vehicle, the aforementioned assist torque is to be added to a torque of the MG outputted for the running of the vehicle.

What is claimed is:

1. A control device for controlling a vehicle that includes:
an internal combustion engine that includes a fuel injection valve configured to inject fuel directly into a cylinder, an ignition device configured to ignite an air-fuel mixture and an in-cylinder pressure sensor configured to detect in-cylinder pressure; and
an electric motor configured to rotate to drive a crankshaft of the internal combustion engine,
wherein the control device is configured, when an assist torque for assisting a rotation of the crankshaft is applied to the crankshaft by means of the electric motor, to perform an ignition start-up operation that starts fuel injection and ignition from an expansion stroke cylinder where a piston therein is in an expansion stroke during stop of the internal combustion engine to start up the internal combustion engine, and
wherein the assist torque is a torque by which the crankshaft is not caused to rotate during the stop of the internal combustion engine, and the assist torque is greater when an in-cylinder pressure in a compression stroke cylinder during the stop of the internal combustion engine is higher, the compression stroke cylinder corresponding to a cylinder where a piston therein is in a compression stroke when an engine start-up request with the ignition start-up operation is made.

2. A control device for controlling a vehicle that includes:
an internal combustion engine that includes a fuel injection valve configured to inject fuel directly into a cylinder and an ignition device configured to ignite an air-fuel mixture; and
an electric motor configured to rotate to drive a crankshaft of the internal combustion engine,
wherein the control device is configured, when an assist torque for assisting a rotation of the crankshaft is applied to the crankshaft by means of the electric motor, to perform an ignition start-up operation that starts fuel injection and ignition from an expansion stroke cylinder where a piston therein is in an expansion stroke during stop of the internal combustion engine to start up the internal combustion engine, and
wherein the assist torque is a torque by which the crankshaft is not caused to rotate during the stop of the internal combustion engine, and is greater when a time period from an engine stop time point to a time point at which an engine start-up request with the ignition start-up operation is made is shorter, while using, as a lower limit of the time period, a value of the time period obtained when an in-cylinder pressure in a compression stroke cylinder where a piston therein is in a compression stroke reaches an atmospheric air pressure.

* * * * *